Jan. 30, 1923.　　　　　　　1,443,832
W. E. BELCHER.
SAFETY HITCH.
FILED DEC. 3, 1920.　　　　2 SHEETS-SHEET 1
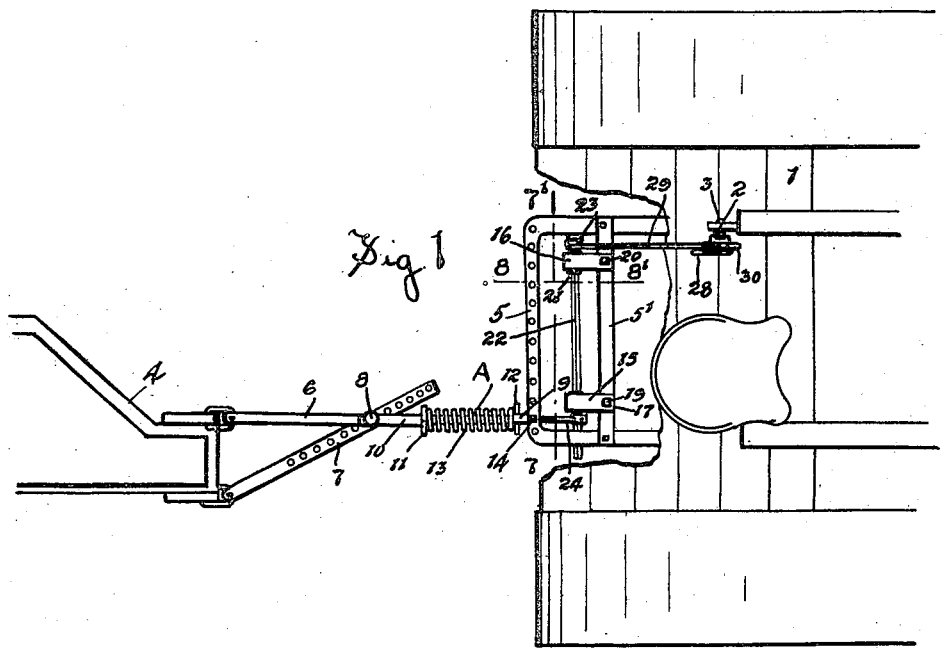
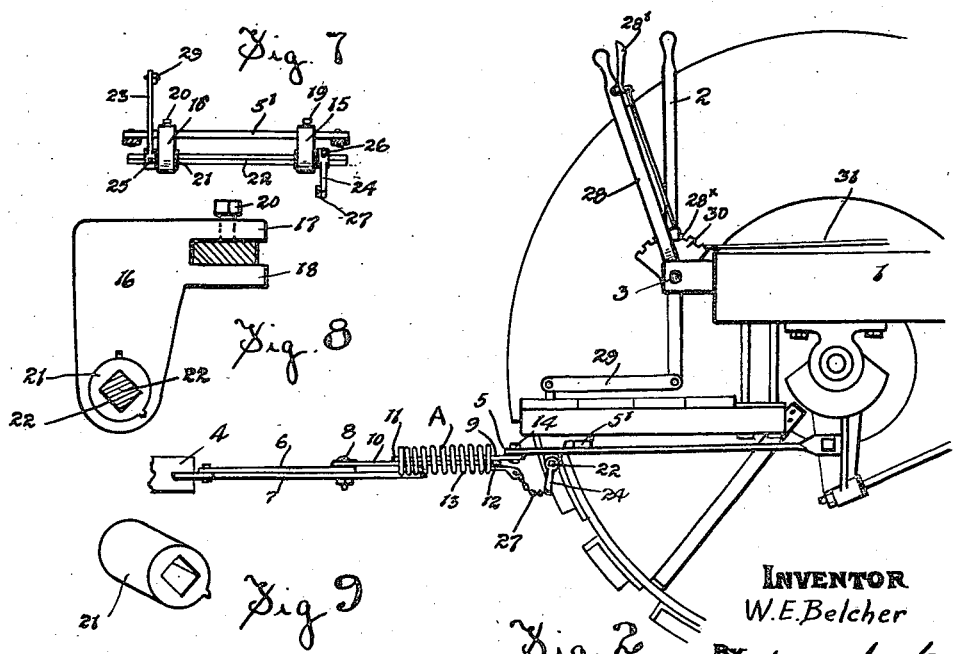
INVENTOR
W. E. Belcher

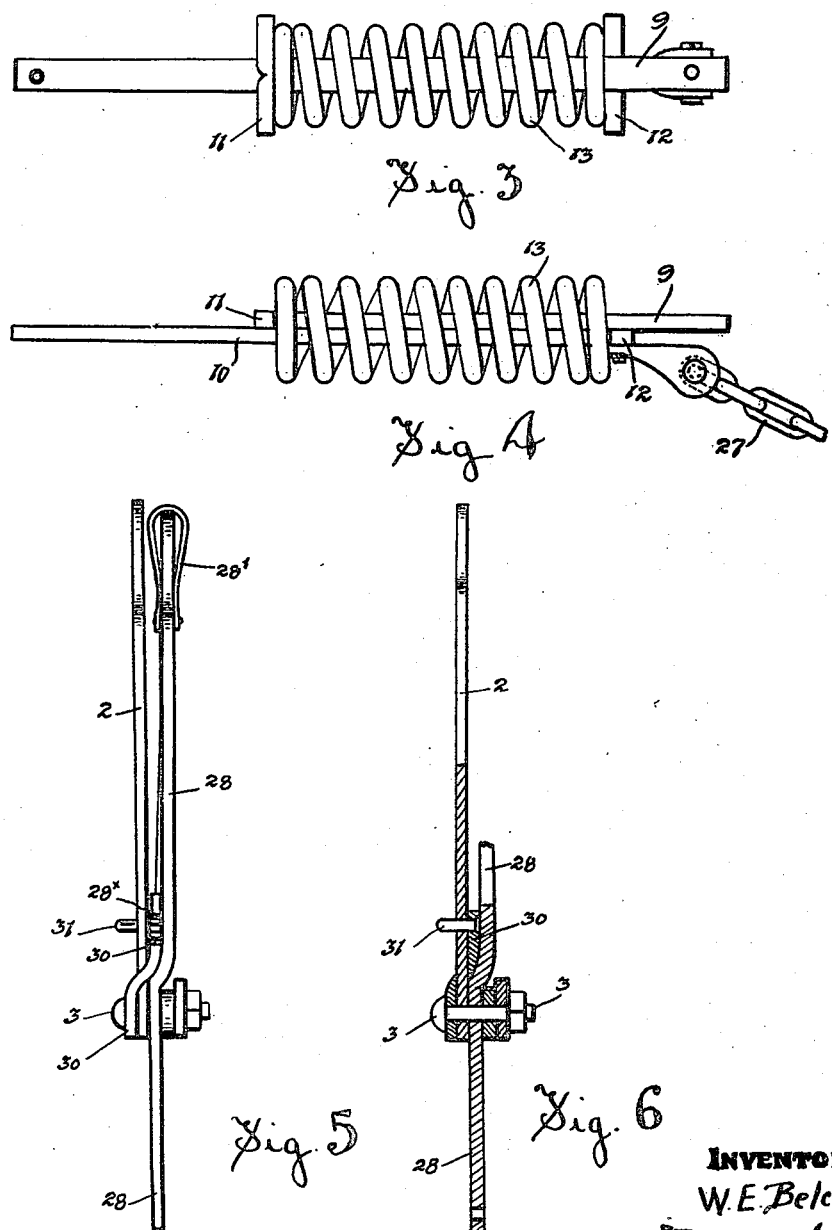

Patented Jan. 30, 1923.

1,443,832

UNITED STATES PATENT OFFICE.

WALTER ERIC BELCHER, OF TEULON, MANITOBA, CANADA, ASSIGNOR TO FREDERICK P. BELCHER, OF WINNIPEG, MANITOBA, CANADA.

SAFETY HITCH.

Application filed December 3, 1920. Serial No. 428,074.

*To all whom it may concern:*

Be it known that I, WALTER ERIC BELCHER, of the town of Teulon, in the Province of Manitoba, Canada, have invented certain new and useful Improvements in Safety Hitches, of which the following is the specification.

The invention relates to improvements in safety hitches and particularly to a hitch used for connecting a farm tractor to a farm implement such as a plow and the general object of the invention is to provide a safety hitch attachment which will automatically throw out the controlling clutch of the tractor and thereby stop it on the load becoming excessive and by so doing obviate any possibility of breakage.

A further object is to construct the device in a cheap and durable manner and so that it can be readily assembled and attached to a plow and tractor.

A further object is to arrange the device so that the tractor or plow can turn without throwing the clutch prematurely.

A further object of the invention is to construct the appliance so that it will fit varying types of tractors without necessitating any change in the tractor structure and also to arrange the appliance so that it can be adjusted to accommodate the position of the clutch levers when fitted to different types of tractors.

With the above more important objects in view the invention consists essentially in the arrangement and construction of parts hereinafter more particularly described and later pointed out in the appended claims, reference being had to the accompanying drawings in which:—

Fig. 1 is a plan view of my invention as it appears in use.

Fig. 2 is a side view of the same.

Fig. 3 is an enlarged detailed plan view of the spring part of the safety hitch.

Fig. 4 is an enlarged detailed side view of the spring part of the safety hitch.

Fig. 5 is a rear view of the clutch controlling lever and the hitch lever.

Fig. 6 is a sectional view through the levers showing their connection to the pivot bolt.

Fig. 7 is a sectional view at 7—7' Fig. 1 and looking forwardly of the tractor.

Fig. 8 is an enlarged detailed sectional view at 8—8' Fig. 1.

Fig. 9 is a perspective view of one of the sleeves.

In the drawings like characters of reference indicate corresponding parts in the several figures.

I may here state that I am aware that heretofore give and take connections have been used in coupling a load to a tractor but I might here point out that in such appliances is so far as I am aware the give and take connection is designed to effect the automatic uncoupling of the load from the tractor upon the load becoming excessive.

My invention does not relate particularly to the give and take connection per se nor to the automatic uncoupling of the tractor from the load but as a give and take connection is necessary to the operation of my appliance I have herein shown the details of the same but do not wish to be restricted to such a connection as my invention could be used with any of the well known spring give and take connections.

Referring now to the drawings:—

1 represents a tractor of any standard type and 2 the clutch lever which controls the movement of the tractor, the tractor being stopped by the back-pulling of the upper end of the clutch lever a predetermined amount, the lever swinging on the pivot bolt 3. Plows or such like implements are hitched to the tractor and constitute the load. The plow beam is indicated at 4 and the draw bar of the tractor at 5.

In the tractor shown (Titan type) there is a stationary reinforcing cross bar 5' directly in advance of the draw bar.

To the forward end of the plow beam I secure a forwardly extending draft bar 6 which is connected by means of a draw bolt 8 to the brace bar 7. Between the bolt 8 and the draw bar 5 I insert a give and take connection indicated generally by the reference character A and constructed in detail as now described.

9 and 10 are a pair of flat bars lying one on top of the other, the bar 9 having its rear end split and bent outwardly to provide a T-head 11 whilst the forward end of the bar 10 is similarly split and bent outwardly to provide a T-head 12. A spiral spring 13 is mounted on the bars 9 and 10, the bars passing through the spring and having the T-heads engaging the opposite ends of the spring so that the spring resists the end pulling of the bars. The rear end of the bar 10 is attached to the forward end of the draft bar by the bolt 8 and the forward end of the bar 9 is connected by means of a bolt 14 to the draw-bar of the tractor at the selected point of draft.

Obviously when the tractor is pulling a plow the load is brought directly on the spring which compresses and expands, depending on the extent of the load. Here I wish again to state that usually there is a coupler associated with the give and take connection which is adapted to be automatically uncoupled to release the load upon the load becoming excessive, such occurring when the spring has been excessively collapsed. This uncoupling of the load feature is quite satisfactory in so far as unhitching is concerned but it is quite possible for the tractor after having been uncoupled to travel a considerable distance away from the plow before the attendant is aware that the load has been released and further there is always more or less difficulty experienced and time lost in re-coupling to the load as the tractor has to be backed to coupling position.

According to my invention I provide associated with the give and take connection a pulling line connected to the load and which is adapted to throw the clutch lever of the tractor when the load becomes excessive and thereby stop the tractor, this occurring without there being actually any uncoupling or unhitching of the tractor from the load. The appliance for operating the clutch lever in such a manner is now described.

To the bar 5' I connect two similar hangers 15 and 16, the forward ends of the hangers being provided with jaws 17 and 18 which span the bar and which are detachably connected to the bar by jam screws 19 and 20. The rear ends of the hangers each form a bearing for a rotatably mounted sleeve 21, the sleeves being provided with square openings which receive a transversely extending square shaft 22. On the opposite ends of the square shaft I mount two cranks 23 and 24, crank 23 extending upwardly and crank 24 extending downwardly. The cranks are secured against end movement on the shaft by jam screws 25 and 26.

According to this arrangement it will be seen that I can not only adjust the hangers on the bar 5' but can also adjust the cranks on the shaft. The adjustment so provided allows me to adjust my appliance to accommodate the tractor on which it is placed. In actual practice the crank 24 is adjusted so that it will lie directly in advance of the hitching bolt 14 whilst the crank 23 is adjusted so that it will lie directly to the rear of the clutch lever 2. The crank 24 is connected by a line or flexible connection such as a short length of chain 27 to the forward end of the bar 10.

On the bolt 3 I mount a special lever 28 which I will call the hitch or auxiliary lever. This lever has the lower end extending beyond the pivot bolt 3 and connected by a connecting bar 29 to the upper end of the crank 23.

The lever 2 is provided with a quadrant 30 which turns with the lever and the lever 28 is provided with the customary hand latch 28' and detent 28$^x$, the detent operating over the quadrant. By this arrangement I am able to lock the lever 28 in various adjusted positions in respect to the lever 2 and further any movement effected in either of these levers when locked together will be transferred one to the other through the quadrant so that they move together.

I have not considered it necessary to show or describe the clutch controlling the movement of the tractor, it being sufficient for the purposes of this description to understand that the clutch rod 31 which is attached to the lever 28 passes forwardly of the tractor to the clutch and is adapted in the back pulling of the said rod to disengage the clutch and in the forward pushing of the rod to engage the clutch.

In connection with the point of attachment of the rear end of the chain 27 to the bar 10, I wish it to be particularly noted that this point lies directly beneath the bolt 14 so that any side swinging of the plow or turning of the tractor in respect to the plow does not alter the relative positions of the said latter bolt and said latter connecting point. In short, when in operation the hitch and the chain both virtually swing around the same vertical pivot point.

In actual practice sufficient slack is left in the chain to allow of the working of the give and take connection under normal load conditions. However, upon the load becoming excessive the chain is initially drawn taut and in the further collapsing of the spring under the excessive load pulls back the lower end of the lever 24, rotates the shaft 22, swings ahead the upper end of the lever 23 and the lower end of the lever 28 and in so doing throws back the lever 2, disengaging the clutch and stopping the tractor.

Here it is remarked that the quadrant connects the two levers together so that any movement produced in the lever 28 is transferred directly to the lever 2. Further, by providing a quadrant connection between the levers I am able to adjust to a nicety the slack which I desire to have in the chain, this being done by adjusting the lever 28 on the quadrant.

By varying the slack in the chain I vary the time at which the device acts to throw the clutch lever as obviously if considerable slack is left in the chain the spring will have to collapse further to produce the necessary movement to throw the clutch lever and on the other hand if little slack is left in the chain a comparatively small compression of the spring will do the work. Further, by having the relative adjustment between the levers I am able to release the lever 28 from lever 2 after the clutch has been thrown and thereby release the spring and also to throw in the lever 2 to engage the clutch when one is ready to start again.

In order to fully appreciate the value of the connecting of the rear end of the chain at a point directly beneath the hitching point of the load to the draw bar it is well to explain what would happen if the rear end of the chain were connected at a point to the side of the hitching point of the load in the event of the tractor turning or the plow swinging in respect to the tractor. If the swing of the plow or the turn of the tractor were in one direction with the setting as just stated the chain would become abnormally slack with the result that the load could become excessive before the slack was entirely taken out of the chain and consequently the tractor clutch would not be thrown until possibly parts had been damaged. On the other hand a turn in the other direction would prematurely tighten the chain and prematurely throw the clutch.

In the specifications and appended claims I have utilized the phrase "give and take connection" and by this phrase I mean any hitching connection which will allow of a relative movement between the pulling device such as a tractor and the pulled device or load such as a plow.

What I claim as my invention is:—

1. The combination with a load, a clutch controlled tractor pulling the load and a give and take connection coupling the tractor to the load, of a cross shaft rotatably mounted on the rear end of the tractor, cranks adjustably mounted on the ends of the shaft, a normally slack pulling line or such like connecting one of the cranks to the load through the give and take connection and an operating connection connecting the other of the cranks with the tractor clutch and adapted to disengage the clutch and stop the tractor in the pulling of the line.

2. The combination with a load, a clutch controlled tractor pulling the load, a clutch lever controlling the clutch and a give and take connection couping the tractor to the load, of a rotatably mounted cross shaft carried by the rear end of the tractor, upwardly and downwardly extending cranks adjustably mounted on the shaft, one of said cranks being directly in advance of the hitching point of connection of the load to the tractor and the other of the cranks being directly to the rear of the clutch lever, a normally slack flexible connection connecting the downwardly extending crank to the load through the give and take connection and a connecting bar connecting the upwardly extending crank indirectly to the clutch lever and adapted to pull back the clutch lever and stop the tractor in the pulling of the line.

3. In a safety hitch for connecting a tractor to a load, the combination with the clutch lever of the tractor, of an auxiliary lever pivotally mounted to swing on the same axis as the clutch lever and having one end extending downwardly beyond the pivot point, means for adjustably fastening the auxiliary lever to the clutch lever and a bar pivotally attached to the lower end of the auxiliary lever.

4. In a safety hitch for a clutch controlled tractor, the combination with a clutch controlling lever, of a rotatably mounted cross shaft carried by the rear part of the tractor, cranks adjustably mounted on the shaft, an auxiliary lever associated with the clutch lever and adjustable in respect to the same, an operating connection between the auxiliary lever and one of the cranks and a flexible pulling connection connected to the other of the cranks.

5. In a safety hitch for a clutch controlled tractor, the combination with a clutch controlling lever, of a pair of hangers detachably and adjustably clamped to the rear part of the tractor, a cross shaft rotatably carried by the hangers, cranks adjustably secured to the shaft, an auxiliary lever associated with the clutch lever, a quadrant, hand latch and detent adjustably connecting the auxiliary lever to the clutch lever, an operating connection between the auxiliary lever and one of the cranks and a flexible pulling connection connected to the other of the cranks.

6. The combination with a tractor and its clutch control lever, of a rack carried by said lever and an auxiliary lever carrying a detent engageable with said rack, a give and take connection for securing a load to the tractor, and a normally slack connection extending between the give and take connection and the auxiliary lever.

Signed at Winnipeg, this 2nd day of November 1920.

WALTER ERIC BELCHER.

In the presence of—
Gerald S. Roxburgh,
K. B. Wakefield.